United States Patent [19]

Takamatsu

[11] 4,101,946
[45] Jul. 18, 1978

[54] TAPE PLAYING MACHINE WITH MOVABLE HEAD MOUNT

[75] Inventor: Ryoji Takamatsu, Tokyo, Japan

[73] Assignee: Sony Corporation, Tokyo, Japan

[21] Appl. No.: 708,898

[22] Filed: Jul. 26, 1976

[30] Foreign Application Priority Data

Jul. 30, 1975 [JP] Japan .......................... 50/106423[U]
Jul. 30, 1975 [JP] Japan .......................... 50/106425[U]
Aug. 14, 1975 [JP] Japan .......................... 50/112237[U]

[51] Int. Cl.² .......................... G11B 5/54; G11B 21/16
[52] U.S. Cl. .................................................. 360/105
[58] Field of Search ................................. 360/96, 105

[56] References Cited

U.S. PATENT DOCUMENTS

| | | | |
|---|---|---|---|
| 3,664,672 | 5/1972 | Fujikawa | 360/105 |
| 3,759,529 | 9/1973 | Yoshii | 360/105 |
| 3,800,324 | 3/1974 | Nakamichi | 360/105 |
| 3,832,734 | 8/1974 | Childress | 360/105 |
| 3,916,443 | 10/1975 | Bumb, Jr. et al. | 360/105 |
| 3,943,569 | 3/1976 | Bettini | 360/105 |

*Primary Examiner*—Jay P. Lucas
*Attorney, Agent, or Firm*—Hill, Gross, Simpson, Van Santen, Steadman, Chiara & Simpson

[57] ABSTRACT

A tape playing machine which has a novel head deck which is capable of moving back and forth and which is mounted on three rollers so as to obtain smooth parallel back and forth action and wherein one of the normal actuating switches of record-players is eliminated and only five actuating buttons are required. The invention further encompasses plastic molded spring rear cassette mounting members which include a cassette biasing feature as well as a feeler pawl for engaging an opening in the cassette so as to determine whether the tape in the cassette can be erased. Additionally, the reel supporting hubs include a cylindrical member with interlocking fingers engageable with the reels so as to lock the reels to the tape chassis.

9 Claims, 13 Drawing Figures

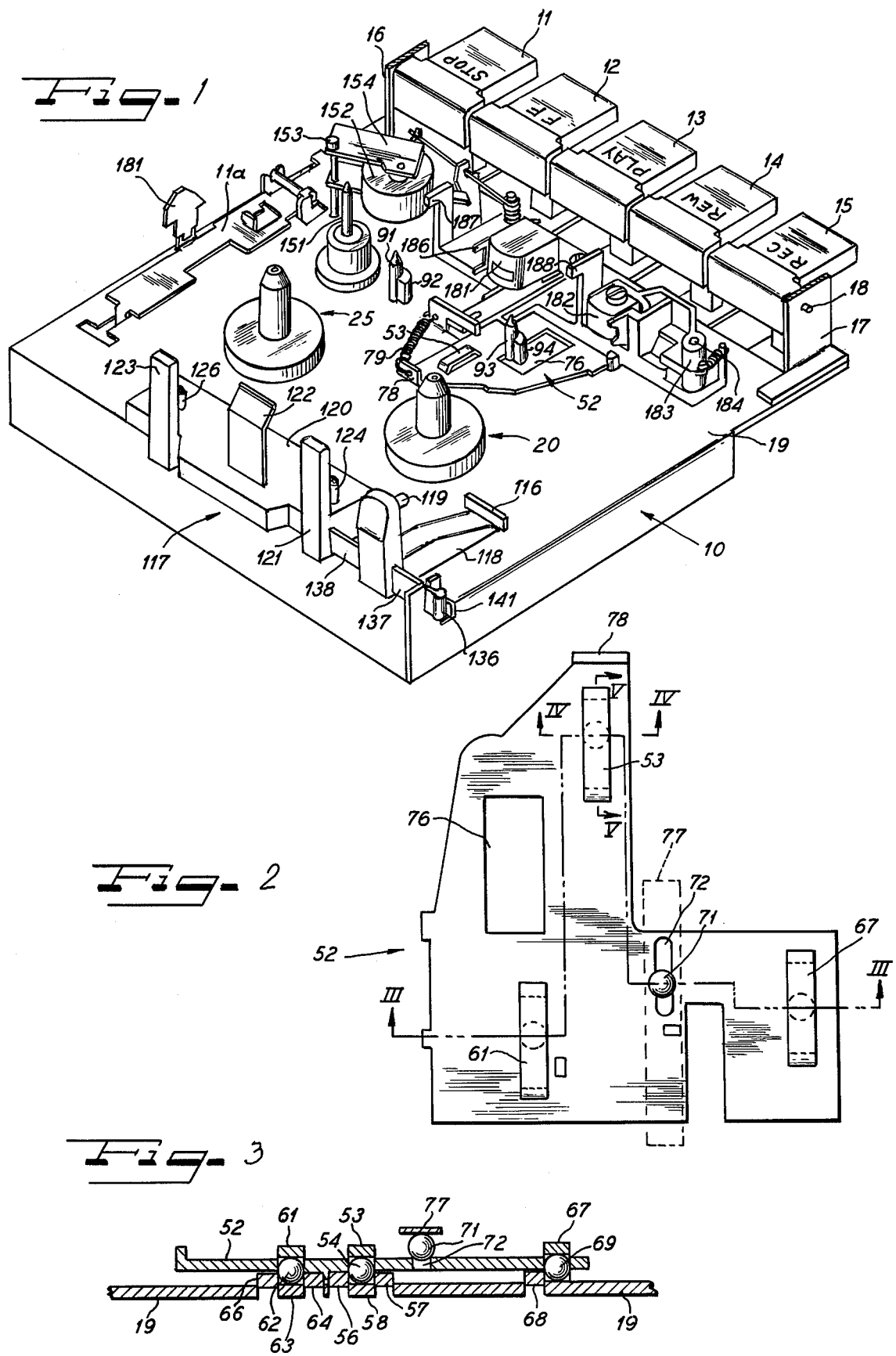

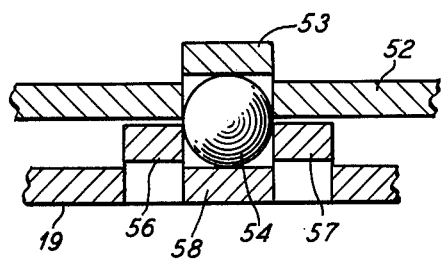
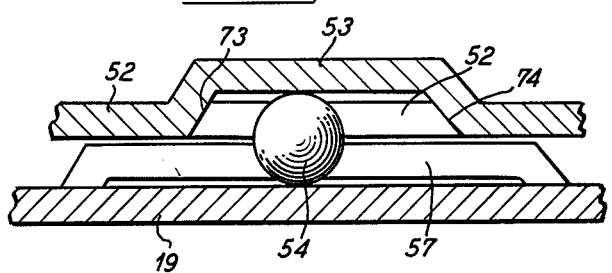
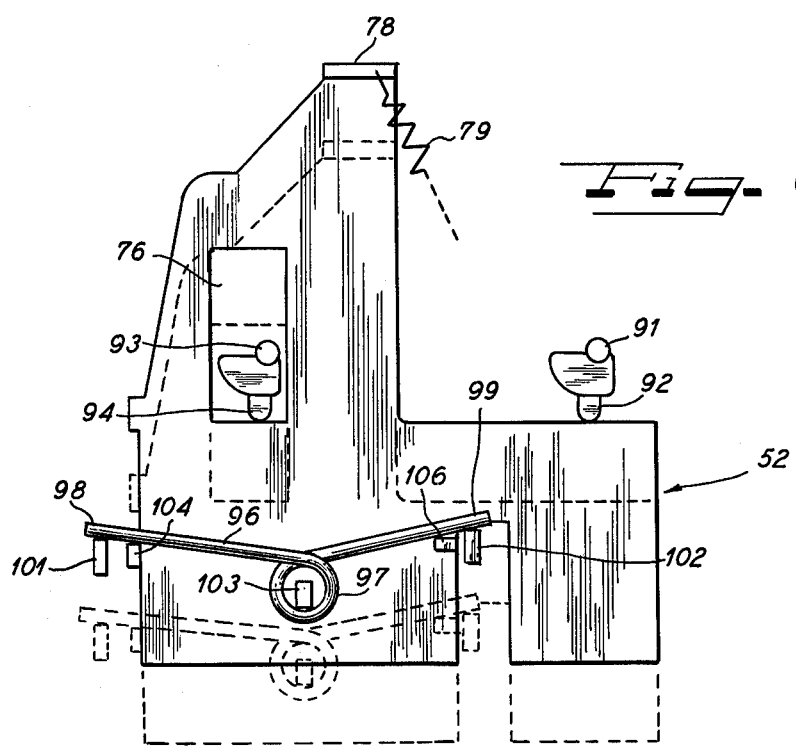
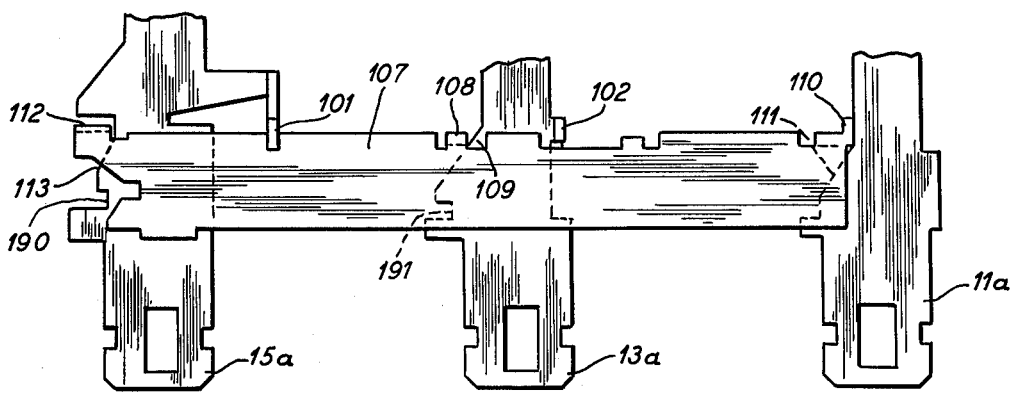

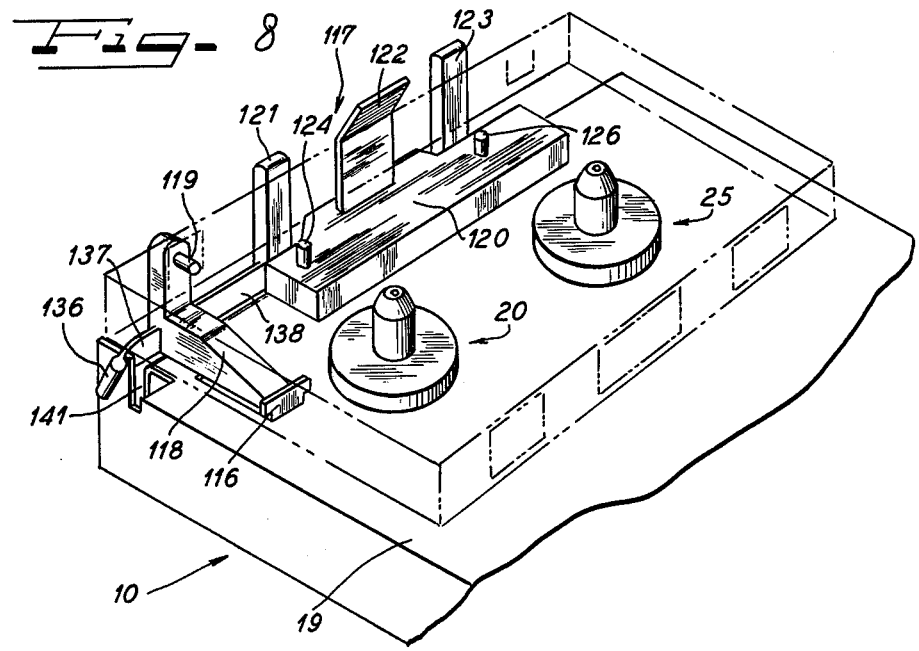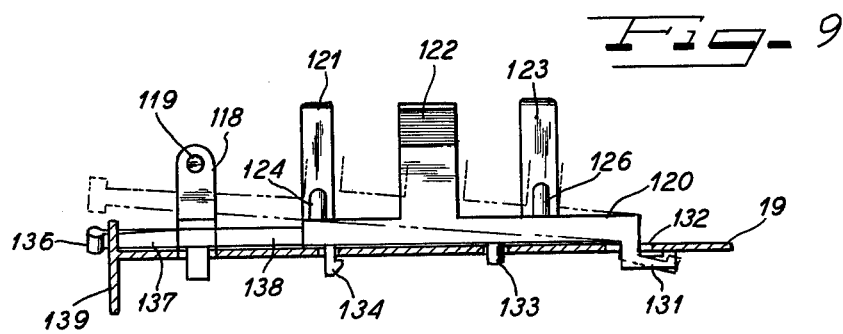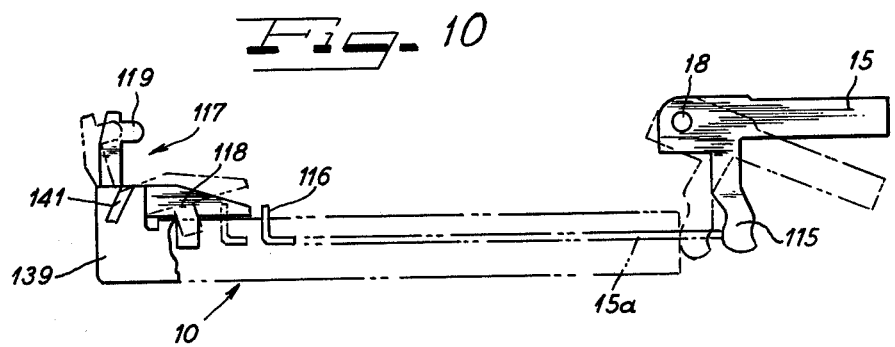

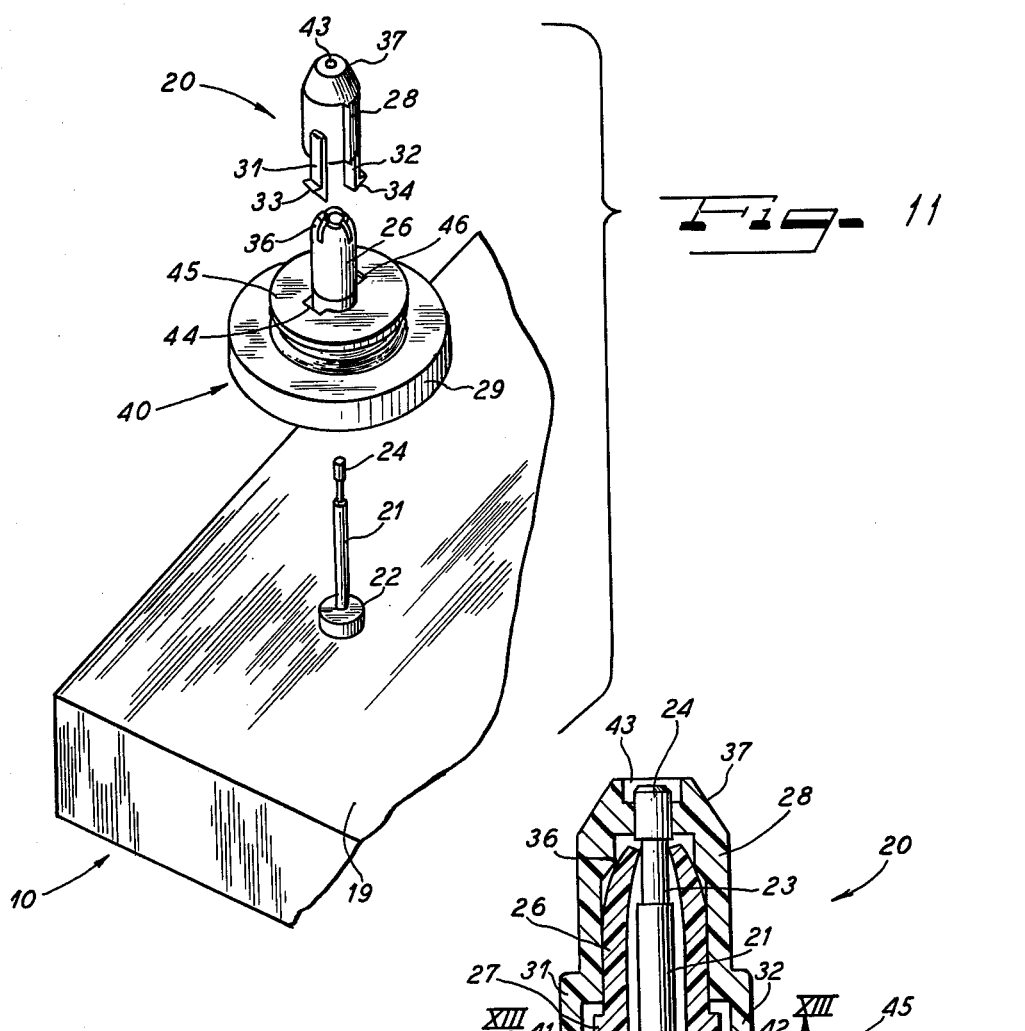
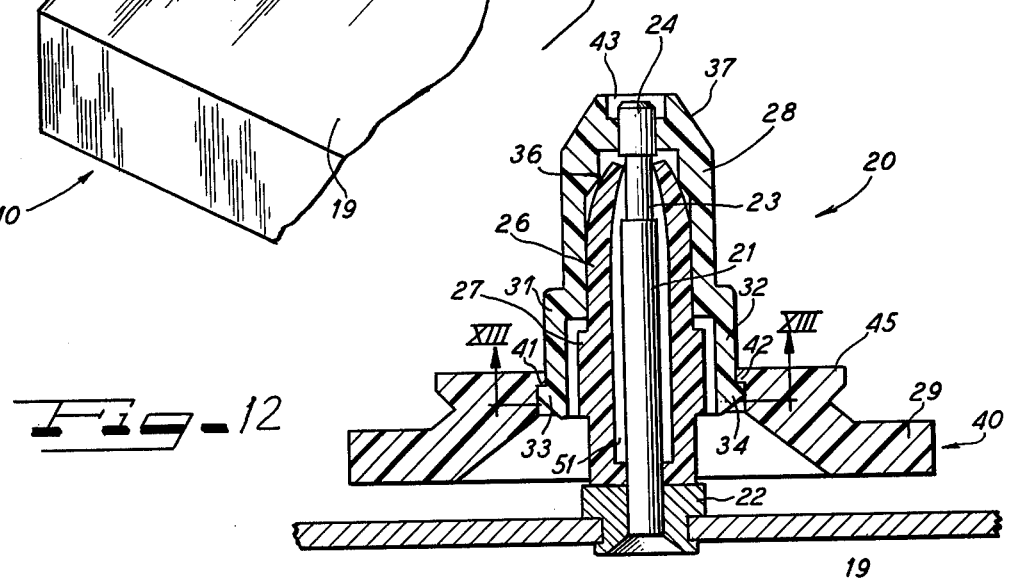
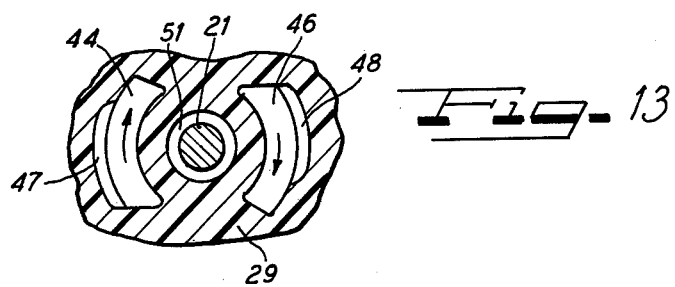

TAPE PLAYING MACHINE WITH MOVABLE HEAD MOUNT

BACKGROUND OF THE INVENTION

1. Field of the Invention

This invention relates in general to tape recorder-playback machines and in particular to a novel tape machine.

2. Description of the Prior Art

Most tape machines of the prior art have utilized six selector keys and often times the head deck which must move to engage the magnetic tape has tended to bind or cock as it is moved back and forth so as to engage the tape. Also, prior art tape machines have required complicated mechanisms for sensing the non-erase slot of the tape cassettes. Furthermore, prior art tape machines have required complicated structures for mounting the two tape reels on the tape machine.

SUMMARY OF THE INVENTION

The present invention relates to a novel tape machine which includes an erase prevent actuator feeler which engages the rear of the cartridge such that if the erase prevent function is present on the tape, the record button cannot be energized and wherein such unit includes a rear plastic unit wherein the flexibility of the plastic unit serves a plurality of functions one of which is to spring bias the erase prevent pawl by mounting it in a slanted slot so as to spring bias such pawl into engagement with the cartridge as well as to provide the spring holding bias for the cartridge.

In addition, a head deck is moveably and slidably supported on the tape chasis by means including a plate which comprises the head deck which is mounted on a plurality of rollers so as to allow simple and easy movement back and forth of the head deck relative to the tape chassis. The head deck can be actuated by means including a spring which can be moved from either of its ends so as to bias the head deck toward the tape from either of two actuating levers and further including stopper means which engage the head deck but which allows the actuating levers to be moved further so as to cause the head deck to stop at a predetermined position while allowing the actuating levers to continue further positions.

Another feature of the invention is the elimination of one of the actuating switches common in recorder-players wherein only five actuating buttons are used. The stop button includes an eject function which is energized by an eject cam so as to remove the cassette from the machine upon complete depression of the stop button.

The invention also incorporates a novel head deck which is mounted on the tape deck by means of balls such that the head deck can move only back and forth relative to the tape chassis and the guides for the balls are pressed with suitable presses into the head deck and into the chasis of the machine so as to form guides for the balls.

Other objects, features and advantages of the invention will be readily apparent from the following description of certain preferred embodiments thereof taken in conjunction with the accompanying drawings although variations and modifications may be effected without departing from the scope and spirit of the novel concepts of the disclosure and in which:

BRIEF DESCRIPTION OF THE DRAWINGS

FIG. 1 is a perspective view of the tape machine of the invention;

FIG. 2 is a top plan view of the head deck of the invention;

FIG. 3 is a sectional view taken on line III—III of FIG. 2;

FIG. 4 is an enlarged sectional view through the center ball guide;

FIG. 5 is a sectional view taken at right angles of the sectional view of FIG. 4 of the center ball guide;

FIG. 6 is a top plan view of the head deck illustrating the actuating spring and stops;

FIG. 7 illustrates the actuating levers in top plan view;

FIG. 8 is a generally perspective view of the rear portion of the machine illustrating the integrally formed plastic erase prevent and cassette locking unit;

FIG. 9 is an enlarged plan view of the rear plastic unit;

FIG. 10 is a side view illustrating the erase prevent feature;

FIG. 11 illustrates in exploded view the reel support of the invention;

FIG. 12 is a sectional view of the reel support; and

FIG. 13 is a top plan detail view of the locking feature of the reel support.

DESCRIPTION OF THE PREFERRED EMBODIMENTS

FIG. 1 illustrates the tape recorder and playback machine of the invention which utilizes only five actuating keys instead of six as in the prior art. A stop eject key 11, a fast forward key 12, a playback key 13, a rewind key 14 and a record key 15 are pivotally supported by a shaft 18 between brackets 16 and 17 on the chassis 19 of the tape machine 10. A pair of reels 20 and 25 are mounted on the chassis 19 and are adapted to receive a cassette thereon. The stop and eject key 11 is coupled to move a bar 11a which carries an eject cam 181 for engaging the cassette to eject it from the machine. A rear plastic unit 117 is formed with guide pins 124 and 126 for centering the cassette and has a spring 122 for engaging the cassette and rear poles 121 and 123 for engaging the rear of the cassette. An erase pawl 118 carries a feeler pin 119 engageable with the cassette to determine if it can be erased. The rear unit 117 is formed of plastic as an integral unit and has portions 138 and 137 with an end 136 that is received in a slanted slot 141 in the chassis 119 so as to bias and hold the unit on the chassis.

A moveable head deck 52 is moveable back and forth on the chassis 119 and is biased by a spring 79 toward the actuating keys 11 through 15 and carries a record and playback head 181 as well as an erase head 182. Tape guides 186 are mounted adjacent the head 181 and front cassette engaging guides 187 and 188 are mounted on the head deck 52.

A pinch roll 152 is supported on bracket 154 which is rotatably supported on shaft 153 and mates with a capstan 151 such that tape from the cassette is driven by engagement of the pinch roll 152 with the capstan 151.

FIGS. 2, 3, 4, 5, 6 and 7 illustrate the details of the mounting and support for the head deck 52.

The head deck 52 is of the general shape illustrated in FIG. 2 and as shown in sectional views 3, 4 and 5 comprises a plate formed with an opening 76 in which a stopper post 93 and a stopper 94 mounted on the chassis 19 is received so as to limit the motion to the left relative to FIG. 1 of the head deck. The head deck 52 is supported on three balls, 62, 54 and 69 from the chassis 19 and for this purpose guides 61, 53 and 67 are formed in the head deck 52 by pressing with a suitable press depressions in the head deck 52. Mating depressions are formed with suitable presses in the chassis 19 such that a ball race and guide is formed by raised portions 66 and 64 of the chassis 19 in cooperation with a center portion between the raised portions 64 and 66 and the portion 61 of the head deck 52. As shown in FIGS. 4 and 5, a raised portion 53 fits over the ball 54 and raised portions 56 and 57 formed in the chassis 19 retain the ball 54 in the guide 53 and the center portion 58 beneath the ball on chassis portion 19 forms a guide and ball race for the ball 54. As illustrated in FIG. 5, the ends 73 and 74 of the depression 53 limit the motion of the head deck 52 relative to the chassis 19.

As shown in FIGS. 2 and 3, a third guide 67 receives a ball 69 and is formed by pressing with a suitable press the head deck 52. A depression 68 is formed in the chassis 19 so as to form a ball race and guide for the ball 69. It is to be noted that a second depression on the right side of the ball relative to FIG. 3 is not required for the third ball 69 because the race ways 53 and 61 specifically restrict the head deck 52 from cocking.

A slot 72 is formed in the head deck 52 and a ball 71 is mounted above the head deck 52 as shown in FIG. 3 and a leaf spring 77 connected to the chassis 19 engages the top of ball 71 and holds the tape deck 52 downwardly against the balls 54, 62 and 69.

As shown in FIG. 6, three projections 103, 104 and 106 extend upwardly from the head deck 52 and a spring 96 has a central portion 97 which is received around the projection 103 and its opposite ends 98 and 99 are held behind the projections 104 and 106. The left end 98 of spring 96 is engageable by a projection 101 on the record bar 15a which is driven by the record button 15. The end 99 of spring 96 is engageable with a projection 102 on the playback bar 13a which is controlled by the playback button 13. Thus, actuation of either the record button 15 or the playback button 13 moves the head deck 52 to the left relative to FIG. 1 by exerting pressure on the spring 96 to move it until it engages stop 94 and a second stop 92 mounted on the pin 91 on the chassis 19 so as to limit its motion in the left direction. However, after the head deck engages the stops 92 and 94 the projections 101 and 102 as well as the record bar 15a and the playback bar 13a can continue to move against the spring ends 98 and 99 for short distances.

FIG. 7 illustrates in top plan view the projections 101 and 102 respectively extending from actuating bars 15a and 13a driven by the record and playback buttons 15 and 13, respectively. As shown in FIG. 10, the end 116 of record bar 15a is engageable with the erase prevent pawl 118 of member 117 on the back of the chassis and thus, the record button 15 cannot be depressed unless a cassette is in the machine and the feeler pawl 119 engages the cassette and moves the erase prevent lever 118 to the dotted line position shown in FIG. 10. This condition exists if the cassette has not been conditioned so as to prevent the eraser by breaking out a removable member in the cassette of a conventional nature. If such removable member has been removed from the cassette then the feeler pin 119 will move into the confines of the cassette and the erase prevent pawl 118 will prevent the record button 15 from being depressed because the end 116 engages the pawl 118. However, if the erase prevent member in the cassette has not been removed, the erase prevent lever 118 will be moved to the dotted position and the end 116 of the record lever 15a can be moved to the left relative to FIG. 10 thus allowing the projection 101 illustrated in FIG. 7 and 6 to move the end 98 of the spring 96 and, thus, the head deck 52 to the record position wherein the erase head 182 erases the tape before it passes the record head 181.

When the record button 15 is depressed, the record bar 15a moves up relative to FIG. 7 and a projection 112 of a locking bar 107 is engaged by a cam surface 113 of the record bar 15a to move the locking bar 107 to the left relative to FIG. 7 against a spring bias not shown. The projection 112 rides into a notch 190 in the record bar 15a to lock it in the depressed position to hold the record function in the energized condition. When the stop and eject button 11 is depressed the stop and ejection bar 11a is moved upward relative to FIG. 7 and a projection 110 on locking bar 107 is moved to the left by cam surface 111 on stop bar 11a which allows the projection 112 to move out of the notch 190 thus releasing the record bar 15a which moves downwardly relative to FIG. 7 due to action of spring 79 on the head deck 52 which biases it to its unenergized position.

When the playback button 13 is depressed, the cam portion 109 moves the locking bar 107 to the left relative to FIG. 7 until the projection 108 fails in a locking notch 191. Simultaneously, the projection 102 moves the head deck 52 to the playback position which condition is maintained until the stop and eject button 11 is depressed to move the projection 108 out of the notch 191 to unlock and allow the playback bar 13a to return to its initial unenergized condition.

The rear plastic unit 117 has a main body portion 120 which carries the spring 122 and the guide posts 121 and 123 as well as the guide pins 124 and 126 and its end is attached to the chassis 19 by a hook portion 131 which passes through a slot 132 as shown in FIG. 9. Locking pawls 133 and 134 pass through mating openings in the chassis 119 as shown in FIG. 9. The flexible portions 138 and 137 support the erase feeler pawl 118 and the end 136 is received in the slot 141 in the end 139 of the chassis as shown in FIGS. 8 and 9. The inherent flexibility of the plastic material from which member 117 is constructed allows the different portions to be integrally formed and to spring bias the erase prevent pawl 118.

The tape supporting reels 20 and 25 are illustrated in detail in FIGS. 11, 12 and 13. Since each of the reels 20 and 25 are constructed similarly FIGS. 11, 12 and 13 will be used to illustrate reel 20 in detail. A shaft 21 is mounted on the chassis 19 in a grommet 22. The upper end 24 of shaft 21 is formed with a groove 23 and a pulley member 40 which has a relatively large friction disk 29 and a smaller disk portion 45 against which the bottom of the cassette rests also has a hub portion 26 which has its upper end 36 slitted is received over the shaft 21 against the grommet 22. An upper reel locking cylindrical portion 28 has an upper tapered portion and a top opening 43 and downwardly extending prongs 31 and 32 that have hooks 33 and 34 which are receivable in slots 44 and 46 of the disk portion 45. The slots 44 and 46 have tapered portions 47 and 48 such that the hooks 33 and 34 can be cammed in and the member 28 rotated so as to lock it to the member 45 and, thus, force the portion 36 of member 26 into the groove 23 to lock the reel to the shaft 21. Thus, once the member 28 is engaged with the member 45 in the slots 44 and 46 the reel 20 is locked to the reel shaft 21.

It is seen that this invention provides a novel tape recorder playback machine which has a novel head deck, as well as a novel rear plastic unit and novel reel structures.

Although the invention has been described with respect to preferred embodiments it is not to be so limited as changes and modifications may be made which are within the full intended scope as defined by the appended claims.

I claim as my invention:

1. In a tape recorder having a chassis, a head deck slidable mounted for back and forth motion on said chassis in first and second directions, a spring on said head deck with its center connected to said head deck and having two extending projections engageable with locking projections on said head deck so that the spring is under spring tension and adaptable such that by pushing on either extending projection of said spring the head deck can be moved in the first direction.

2. In a tape recording/reproducing apparatus comprising a chassis, a first actuating push bar, a second actuating push bar, a head deck mounted on said chassis for back and forth movement in first and second directions, spring means attached to said head deck at a generally central position and having first and second extending portions, said first actuating push bar engageable with said first extending portion and said second actuating push bar engageable with said second extending portion to move said head deck in a first direction, return spring means connected between said chassis and said head deck to move it in a second direction, and stop means for limiting the motion of said head deck in said first direction but allowing said first and second actuating push bars to continue movement after said head deck has engaged said stop.

3. In a tape player according to claim 2 wherein said head deck and said chassis are separated by at three balls which provide bearings between said head deck and chassis.

4. In a tape player according to claim 3 wherein a first one of said balls is mounted in a first guide and raceway formed between said chassis and head deck.

5. In a tape deck according to claim 4 wherein a second one of said balls is mounted in a second guide and raceway formed between said chassis and head deck.

6. In a tape deck according to claim 5 wherein said third one of said balls is mounted in a second guide and raceway formed between said chassis and head deck.

7. In a tape deck according to claim 6 means urging said head deck and chassis together.

8. In a tape deck according to claim 7 wherein said means urging said head deck and chassis together comprise a forth ball mounted in slot in said head deck and a spring attached to said chassis and holding said fourth ball in said slot.

9. In a tape recording/reproducing apparatus comprising a chassis, a first actuating push bar driven by a record button, a second actuating push bar driven by a playback button, a head deck mounted on said chassis for back and forth movement in first and second directions, spring means attached to said head deck at a generally central position and having first and second extending portions, said first actuating push bar engageable with said first extending portion and said second actuating push bar engageable with said second extending portion to move said head deck in a first direction, return spring means connected between said chassis and said head deck to move it in said second direction, and stop means for limiting the motion of said head deck in said first direction but allowing said first and second actuating push bars to continue movement after said head deck has engaged said stop.

* * * * *